US007560878B2

(12) United States Patent
Bernitz et al.

(10) Patent No.: US 7,560,878 B2
(45) Date of Patent: Jul. 14, 2009

(54) CIRCUIT ARRANGEMENT AND METHOD FOR OPERATING HIGH-PRESSURE DISCHARGE LAMPS

(75) Inventors: Franz Bernitz, Unterhaching (DE); Christian Breuer, München (DE); Andreas Huber, Maisach (DE); Kai Wolter, Berlin (DE)

(73) Assignee: Patent-Treuhand-Gesellschaft fur elektrische, Munich (DE)

( * ) Notice: Subject to any disclaimer, the term of this patent is extended or adjusted under 35 U.S.C. 154(b) by 412 days.

(21) Appl. No.: 11/449,981

(22) Filed: Jun. 9, 2006

(65) Prior Publication Data

US 2006/0290293 A1 Dec. 28, 2006

(30) Foreign Application Priority Data

Jun. 17, 2005 (DE) ...................... 10 2005 028 239

(51) Int. Cl.
*G05F 1/00* (2006.01)

(52) U.S. Cl. ...................... 315/307; 315/291; 315/360; 315/224

(58) Field of Classification Search .................. 315/77, 315/82, 209 R, 224, 291, 307, 308, 360
See application file for complete search history.

(56) References Cited

U.S. PATENT DOCUMENTS

| | | | | |
|---|---|---|---|---|
| 5,422,548 | A | 6/1995 | Yamashita et al. | |
| 6,525,489 | B2 * | 2/2003 | Rudolph | 315/225 |
| 6,534,932 | B1 | 3/2003 | Klinkenberg | |
| 6,717,374 | B2 * | 4/2004 | Krummel | 315/291 |
| 6,963,178 | B1 * | 11/2005 | Lev et al. | 315/307 |

FOREIGN PATENT DOCUMENTS

| | | | |
|---|---|---|---|
| DE | 197 15 254 | A1 | 10/1998 |
| EP | 1 076 478 | A2 | 2/2001 |
| FR | 2 646 538 | A1 | 11/1990 |

* cited by examiner

*Primary Examiner*—Haissa Philogene
(74) *Attorney, Agent, or Firm*—Frishauf, Holtz, Goodman & Chick, P.C.

(57) ABSTRACT

High-pressure discharge lamps may explode at the end of their life. In order to be able to predict an explosion, the gradient of the operating voltage is evaluated. If a risk of explosion is detected, the lamp operation is interrupted.

16 Claims, 2 Drawing Sheets

CIRCUIT ARRANGEMENT AND METHOD FOR OPERATING HIGH-PRESSURE DISCHARGE LAMPS

TECHNICAL FIELD

The invention relates to circuit arrangements which are used in operating devices for operating high-pressure discharge lamps, referred to below as lamps for short. These circuit arrangements are in particular ones which are suitable for detecting, in advance, an explosion of a lamp which is being operated and interrupting the operation of the lamp. The invention also relates to a method for predicting the failure of a lamp, in particular owing to an explosion.

PRIOR ART

There is the risk with high-pressure discharge lamps of the lamp exploding at the end of its life. This risk is particularly prevalent in the case of ultra-high-pressure discharge lamps.

Such lamps have been developed for optically demanding applications such as data projectors and rear projection televisions. Precisely in these applications it is possible for a lamp explosion to be dangerous to people and to bring about considerable damage in the appliance used. When operating high-pressure discharge lamps, measures therefore need to be taken in order to protect against lamp explosions. The lamp is generally accommodated in a housing, which rules out any danger to people. The housing also prevents any more severe damage to the appliance used. However, it may be necessary to repair an appliance after an explosion. In addition, an explosion produces a bang which is detrimental to a user's trust in an appliance.

When operating high-pressure discharge lamps, there is therefore the problem of reducing the probability of a lamp explosion to a minimum. This takes place in the prior art simply by the fact that lamps are replaced when a predetermined operating time has been reached, even if they are still capable of functioning. This means that the life of the lamps is not completely utilized. In addition, there are also lamps which explode before they reach the predetermined operating time.

SUMMARY OF THE INVENTION

One object of the present invention is to provide a circuit arrangement for operating high-pressure discharge lamps which makes it possible to predict a lamp explosion and ends lamp operation before the lamp explodes.

This is achieved by a circuit arrangement having the following features:

- two connection terminals (J1, J2) for connecting a high-pressure discharge lamp, an operating voltage being applied between the connection terminals during operation of a high-pressure discharge lamp,
- a measuring device for measuring the operating voltage,
- an evaluation device, which is coupled to the measuring device and is suitable for providing a rating number, which represents a measure of the change over time in the operating voltage,
- a shutdown device, which interrupts the operation of a connected high-pressure discharge lamp if the value of the rating number exceeds a predetermined limit value.

One further aspect of the invention is to provide an operating device for operating high-pressure discharge lamps which contains an abovementioned circuit arrangement which makes it possible to predict a lamp explosion.

One further aspect of the invention is to provide a method for operating high-pressure discharge lamps which makes it possible to predict a lamp explosion.

When operating a high-pressure discharge lamp, an operating voltage arises between the connections of the lamp. The operating voltage increases once a lamp has been started until an operating pressure has been established in the lamp. When the operating pressure is reached, the operating voltage remains essentially constant. Owing to erosion of the electrodes of the lamp, an increase in the operating voltage generally occurs over the life.

In comparison with lamps which are not at risk, it has been shown that the profile over time of the operating voltage of lamps which are just about to explode has characteristic changes. A first change can be established when the operating voltage is run up after starting. A lamp which is just about to explode reaches the plateau for a stable operating pressure earlier, at which plateau the operating voltage initially remains approximately constant. The change over time in the operating voltage in the case of lamps which are at risk is accordingly greater than in the case of those which are not at risk. The abovementioned rating number is therefore greater in the case of lamps which are at risk than in the case of those which are not at risk. According to the invention, the comparison of the rating number with a predetermined limit value results in the operation of the lamp being interrupted with the aid of a shutdown device.

Over the course of operation, the second change in the operating voltage occurs. Directly before the explosion, the operating voltage decreases severely. According to the invention, this change over time in the operating voltage also leads to an increased rating number and thus to shutdown of the lamp.

BRIEF DESCRIPTION OF THE DRAWINGS

The invention will be explained in more detail below using exemplary embodiments with reference to drawings, in which.

PREFERRED EMBODIMENT OF THE INVENTION

Figure 1:
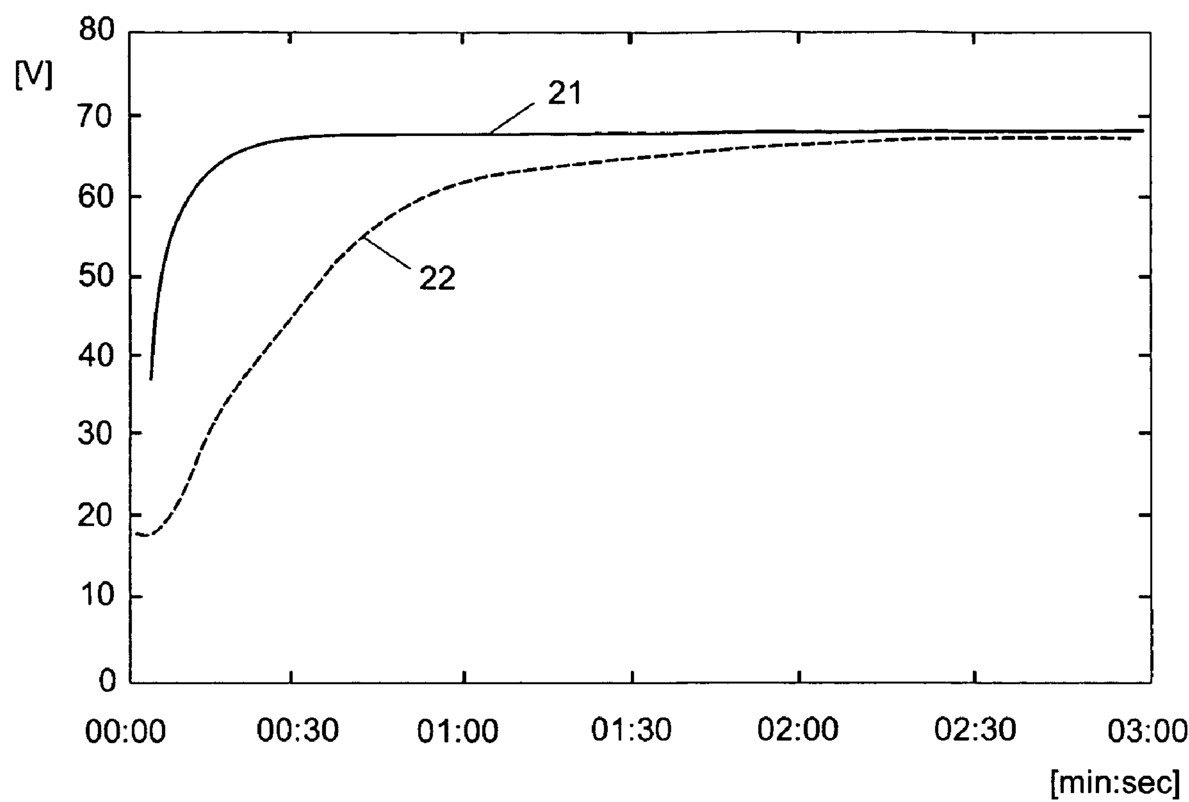
FIG. 1 shows the profile of the operating voltage of a high-pressure discharge lamp which is at risk of explosion and a high-pressure discharge lamp which is not at risk of explosion, after starting.

FIG. 1 shows operating voltage profiles directly after starting a 250 W high-pressure discharge lamp for projection applications. Curve 22 was plotted using a lamp which is not at risk of explosion. The time in minutes and seconds is represented on the x axis. Curve 21 shows the operating voltage profile of a lamp which is at risk of explosion. It can be seen that, in the case of the lamp which is not at risk of explosion, a stable operating voltage value is achieved after approximately three minutes, whereas, in the case of the lamp which is at risk of explosion, this is the case even after less than one minute. In the case of the lamp which is at risk of explosion, a substantially more rapid change over time in the operating voltage therefore results, which can be used to predict a lamp explosion. When evaluating the change over time in the operating voltage directly after starting, an evaluation device assesses an increasing operating voltage as positive, for example, and makes available a positive rating number, without restricting the generality. Correspondingly, a shutdown device interrupts the operation of a lamp if the rating number exceeds a positive limit value. Equally, an increasing operating voltage may lead to a negative rating number and the event of a negative limit value being undershot may lead to shutdown.

Figure 2:
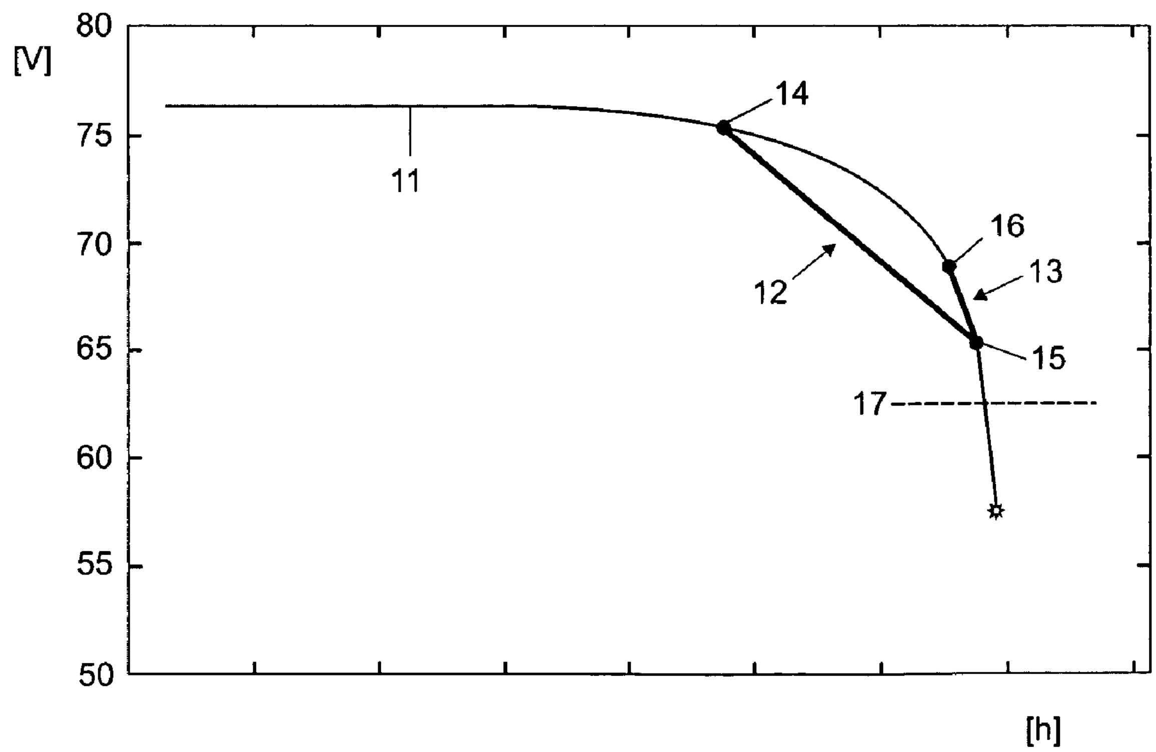
FIG. 2 shows the profile of the operating voltage of a high-pressure discharge lamp before the explosion.

FIG. 2 shows, using curve 11, the profile over time of the operating voltage of a 250 W high-pressure discharge lamp for projection applications in the last six hours before the explosion. The explosion is indicated at the right-hand end point of curve 11 by a star. It can clearly be seen how the operating voltage begins to drop approximately 2 h before the explosion. According to the invention, this change over time in the operating voltage is detected by a measuring device and fed to an evaluation device. The evaluation device produces a rating number from the measured values which represents a measure of the change over time in the operating voltage. Without restricting the generality, for example, a falling operating voltage leads to a positive rating number. Correspondingly, a shutdown device interrupts the operation of a lamp if the rating number exceeds a positive limit value. Equally, a falling operating voltage may lead to a negative rating number and the event of a negative limit value being undershot may lead to shutdown.

The evaluation of the change over time may take place in analog or digital fashion. In the case of an analog solution, a measured variable for the operating voltage can be evaluated by means of a high-pass filter. A more rapid change in the operating voltage then leads to a stronger signal after the high-pass filter.

Figure 3:
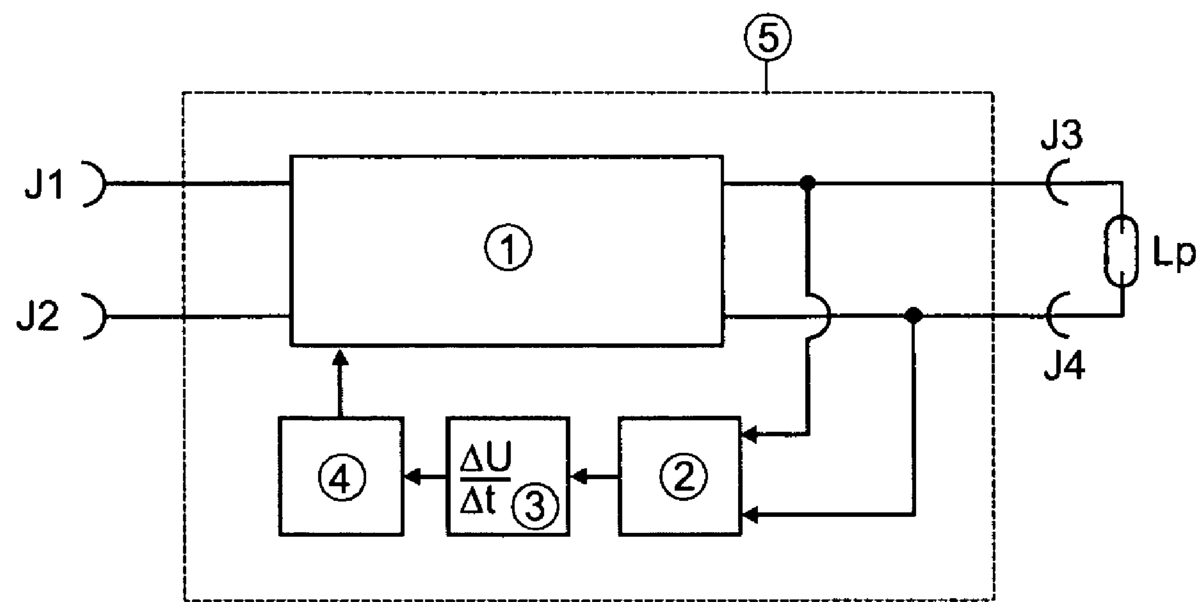
FIG. 3 shows a block circuit diagram of a circuit arrangement according to the invention.

However, a digital solution is usually preferred since it is thus possible to implement complex evaluation of the operating voltage profile without a great deal of complexity. FIG. 3 illustrates a general block circuit diagram of a circuit arrangement 5 according to the invention. The circuit arrangement 5 contains a power supply 1 for the lamp Lp. The power supply 1 can be connected to an energy source via terminals J1 and J2 and makes available a current suitable for the operation of the lamp Lp via terminals J3 and J4. The operating voltage is tapped off in parallel with the terminals J3 and J4 and fed to a measuring device 2. The task of the measuring device 2 is to make available a signal to an evaluation device 3, which signal is proportional to the operating voltage and is present in electrical form, in which form it can be processed by the evaluation device 3. In the simplest case, the measuring device 2 comprises a voltage divider which matches the level of the operating voltage to the evaluation device 3. This can also take place with the aid of transformers, which provide DC-isolation. The measuring device 2 may also not be connected directly to the terminals J3 and J4, but detect internal variables of the power supply 1 and, from these variables, derive a signal which is proportional to the operating voltage.

The evaluation of the change over time in the operating voltage advantageously takes place by means of a software program in a microcontroller.

First, the evaluation of the falling operating voltage before the explosion will be explained. Fundamental problems in measurement technology which may occur in the process and whose solutions can be transferred to the evaluation of the operating voltage after starting. As can be seen from FIG. 2, the drop in the operating voltage begins approximately 2 h before the explosion. The evaluation device 3 therefore evaluates the operating voltage in a long-term window, which is longer than one hour. As is illustrated in FIG. 2, for this purpose the evaluation device 3 compares a value 15, which is presently produced by the measuring device 2, with a measured value 14 for the operating voltage, which has been stored more than one hour earlier. For example, the evaluation device calculates the difference between a 2 h-old measured value and a present value and therefore obtains a measure of the 2 h gradient (FIG. 2, 12) of the operating voltage. In the simplest case, this difference is equal to a rating number. The rating number is fed to a shutdown device 4, as can be seen in FIG. 3. Said shutdown device 4 compares the rating number with a predetermined, stored limit value and interrupts the lamp operation if the limit value is exceeded.

The microcontrollers used in generic operating devices are capable of detecting a present measured value for the operating voltage with a clock of one millisecond and of comparing this present measured value with a stored value. In order to save on memory space, a new measured value for 2 h is not stored every millisecond. It is sufficient for predicting a lamp explosion if a new measured value is stored only every second. In order to suppress interference, it is advantageous if the stored value is formed by averaging from a plurality of measured values. For this purpose, the microcontroller generally forms a so-called serial integral over a time window of one second.

A more accurate prediction of the explosion can be achieved if the evaluation device 3 evaluates the change over time in the operating voltage in a short-term window, which is between 10 and 20 minutes long. As is illustrated by way of example in FIG. 2, the evaluation device 3 compares a present measured value 15 with a measured value 16, which has been stored 15 minutes previously. A 15 minute gradient results from the difference between the measured values 16 and 15. In the simplest case, this 15 minute gradient is equal to a rating number, which is compared with a predetermined limit value in the evaluation device 3.

A more precise prediction of the explosion is achieved by a gradient being formed both in a long-term window and in a short-term window. This provides two criteria which need to be summarized to form one rating number. The evaluation device 3 achieves this by each criterion being weighted and by the weighted criteria being added up. This can be expressed by the following formula:

$$\text{Rating number} = \sum_{n} (\mathit{Criterion}_n \cdot \mathit{Weighting}_n).$$

A further increase in the accuracy of the prediction of the lamp explosion is achieved if the evaluation device 3 forms the difference or the quotient of the evaluation in the long-term window and the evaluation in the short-term window in order to provide the rating number. A further criterion is therefore introduced into the above formula, and this criterion indicates how severely the gradient of the operating voltage has risen. In this case, the quotient provides a better indication of the prediction. However, the calculation of the quotient as compared with the difference means greater complexity in the microcontroller.

A further increase in the accuracy of the prediction of the lamp explosion is achieved if the evaluation device evaluates the instantaneous operating voltage in order to provide the rating number. This takes into account the fact that a very low operating voltage leads to a very high lamp current in the case of a regulated lamp power. This may lead, on the one hand, to destruction of the operating device and, on the other hand, to destruction of the lamp owing to a high current load on the lamp electrodes. If the operating voltage falls below a predetermined value, as is indicated by the dashed line 17 in FIG. 2, it is therefore advantageous to interrupt lamp operation. This can be introduced as a further criterion in the above formula.

The provision of this criterion may take place in various ways. The criterion may be the reciprocal of the operating voltage. It may also be the difference between a predetermined lower limit for the operating voltage and the present operating voltage. A further possibility for providing this criterion consists in a functional dependence (defined in piecemeal fashion) on the present operating voltage: if the present operating voltage is above a lower limit, the criterion has the value zero; if the present operating voltage falls below this lower limit, the criterion has the value 1. Owing to this criterion having a severe weighting, the limit being undershot leads to the lamp being shut down.

Suitable weightings are given below by way of example for a 250 W lamp:

Criterion 1: 15 minute gradient; weighting 1=50
Criterion 2: 2 hour gradient; weighting 2=10
Criterion 3: criterion 1/criterion 2; weighting 3=120
Criterion 4: Reciprocal of the present operating voltage; weighting 4=6000.

A limit value of 500 is suitable for the rating number calculated in this manner in order to rule out a lamp explosion with a high degree of reliability.

The weightings when operating other lamps need to be determined by means of tests.

The above-described complex evaluation of the operating voltage before the explosion, as is illustrated in FIG. 2, can also be applied to the operating voltage profile after starting of the lamp shown in FIG. 1. For this purpose, other weightings need to be selected, of course. Other or further criteria can also be introduced.

It is also possible for the operating voltage to be evaluated after starting and before the explosion. In this case, the weightings are advantageously altered as a function of time. Directly after starting, the weightings are selected such that a lamp which is at risk of explosion is identified owing to the abnormally rapid rise in the operating voltage. For example, three minutes after starting, the weightings are modified such that an explosion can be predicted owing to the drop in the operating voltage. In this case, the evaluation of the operating voltage after starting may influence the further profile over time of the weightings. If, when the lamp is run up after starting, it is established that the lamp is possibly at risk of explosion, this knowledge may be used in the further evaluation of the operating voltage. In the same manner, the stored limit value in the shutdown device 4 can also be made to be dependent on the evaluation of the operating voltage after starting.

The invention claimed is:

1. A circuit arrangement comprising:

two connection terminals for connecting a high-pressure discharge lamp, wherein an operating voltage is applied between the connection terminals during operation of the high-pressure discharge lamp;

a measuring device for measuring the operating voltage;

an evaluation device which is coupled to the measuring device, and which is configured to provide a rating number that represents a measure of a change over time in the operating voltage;

a shutdown device which interrupts operation of the connected high-pressure discharge lamp if a value of the rating number exceeds a predetermined limit value, wherein the evaluation device assesses a falling operating voltage as positive and the limit value is positive.

2. The circuit arrangement as claimed in claim 1, wherein:

the evaluation device calculates the rating number in accordance with the following formula:

$$\text{Rating number} = \sum_n (Criterion_n \cdot Weighting_n),$$

where:

n is a natural number, $Criterion_1$ is the change over time in the operating voltage in a short-term window, which is between 10 and 20 minutes long, $Criterion_2$ is the change over time in the operating voltage in a long-term window, which is longer than one hour, $Criterion_3$ is $Criterion_1/Criterion_2$, $Criterion_4$ is a reciprocal of an instantaneous operating voltage, and $Weighting_n$ is a weighting factor for the respective criterion.

3. The circuit arrangement as claimed in claim 1, wherein the evaluation device evaluates the change over time in the operating voltage in a short-term window, which is between 10 and 20 minutes long.

4. The circuit arrangement as claimed in claim 1, wherein the evaluation device evaluates the change over time in the operating voltage in a long-term window, which is longer than one hour.

5. The circuit arrangement as claimed in claim 4, wherein the evaluation device evaluates the change over time in the operating voltage in a short-term window, which is between 10 and 20 minutes long.

6. The circuit arrangement as claimed in claim 5, wherein the evaluation device forms a weighted sum of the evaluation in the long-term window and the evaluation in the short-term window in order to provide the rating number.

7. The circuit arrangement as claimed in claim 5, wherein the evaluation device forms a difference or a quotient of the evaluation in the long-term window and the evaluation in the short-term window in order to provide the rating number.

8. The circuit arrangement as claimed in claim 1, wherein the evaluation device evaluates an instantaneous operating voltage in order to provide the rating number.

9. A circuit arrangement comprising:

two connection terminals for connecting a high-pressure discharge lamp, wherein an operating voltage is applied between the connection terminals during operation of the high-pressure discharge lamp;

a measuring device for measuring the operating voltage;

an evaluation device which is coupled to the measuring device, and which is configured to provide a rating number that represents a measure of a change over time in the operating voltage;

a shutdown device which interrupts operation of the connected high-pressure discharge lamp if a value of the rating number exceeds a predetermined limit value, wherein the evaluation device assesses an increasing operating voltage as positive and the limit value is positive.

10. A circuit arrangement comprising:

two connection terminals for connecting a high-pressure discharge lamp, wherein an operating voltage is applied between the connection terminals during operation of the high-pressure discharge lamp;

a measuring device for measuring the operating voltage;

an evaluation device which is coupled to the measuring device, and which is configured to provide a rating number that represents a measure of a change over time in the operating voltage;

a shutdown device which interrupts operation of the connected high-pressure discharge lamp if a value of the rating number exceeds a predetermined limit value, wherein once it has first been brought into operation, the evaluation device assesses an increasing operating voltage as positive and the limit value is positive and, in the course of the operation, the evaluation device changes over to evaluating a falling operating voltage as positive.

11. A circuit arrangement comprising:

two connection terminals for connecting a high-pressure discharge lamp, wherein an operating voltage is applied between the connection terminals during operation of the high-pressure discharge lamp;

a measuring device for measuring the operating voltage;

an evaluation device which is coupled to the measuring device, and which is configured to provide a rating number that represents a measure of a change over time in the operating voltage;

a shutdown device which interrupts operation of the connected high-pressure discharge lamp if a value of the rating number exceeds a predetermined limit value, wherein the evaluation device evaluates the change over time in the operating voltage in a short-term window, which is between 10 and 20 minutes long.

12. A method for predicting failure of a high-pressure discharge lamp, comprising:

fixing a limit value;

bringing the high-pressure discharge lamp into operation;

measuring and storing a value of an operating voltage;

waiting for a predetermined time interval;

re-measuring a value of the operating voltage after the waiting for the predetermined time interval;

finding a difference between the stored value for the operating voltage and the remeasured value for the operating voltage;

comparing the difference with the limit value;

bringing the high-pressure discharge lamp out of operation if the difference is greater than the limit value.

13. A circuit arrangement comprising:

two connection terminals for connecting a high-pressure discharge lamp, wherein an operating voltage is applied between the connection terminals during operation of the high-pressure discharge lamp;

a measuring device for measuring the operating voltage;

an evaluation device which is coupled to the measuring device, and which is configured to provide a rating number that represents a measure of a change over time in the operating voltage;

a shutdown device which interrupts operation of the connected high-pressure discharge lamp if a value of the rating number exceeds a predetermined limit value, wherein the evaluation device evaluates the change over time in the operating voltage in a long-term window, which is longer than one hour.

14. The circuit arrangement as claimed in claim 13, wherein the evaluation device evaluates the change over time in the operating voltage in a short-term window, which is between 10 and 20 minutes long.

15. The circuit arrangement as claimed in claim 14, wherein the evaluation device forms a weighted sum of the evaluation in the long-term window and the evaluation in the short-term window in order to provide the rating number.

16. The circuit arrangement as claimed in claim 14, wherein the evaluation device forms a difference or a quotient of the evaluation in the long-term window and the evaluation in the short-term window in order to provide the rating number.

* * * * *